C. REBSTOCK & J. OTTNER.

Door-Knobs.

No. 5,445.

Reissued June 10, 1873.

Witnesses:
C. Sedgwick
H. W. Munn

Inventor:
C. Rebstock
J. Ottner

Per Munn & Co.
Attorneys.

AM PHOTO-LITHOGRAPHIC CO. N.Y. (OSBORNE'S PROCESS)

UNITED STATES PATENT OFFICE.

CHRISTIAN REBSTOCK AND JOSEPH OTTNER, OF BRIDGEPORT, CONNECTICUT, ASSIGNORS, BY MESNE ASSIGNMENTS, TO THE BRIDGEPORT ELECTRO-CASTING COMPANY.

IMPROVEMENT IN DOOR-KNOBS.

Specification forming part of Letters Patent No. 134,931, dated January 14, 1873; reissue No. 5,445, dated June 10, 1873; application filed March 22, 1873.

DIVISION B.

*To all whom it may concern:*

Be it known that I, CHRISTIAN REBSTOCK and JOSEPH OTTNER, of Bridgeport, in the county of Fairfield and State of Connecticut, have invented a new and useful Improvement in Metallic Knobs, of which the following is a specification:

The object of our invention is to furnish to builders and the public an improved metallic door-knob, which may not only be finished in the most ornamental manner and sold at reasonable price, but which, by its lightness, durability, and strength, excels the heavy and expensive knobs at present in use. Our invention consists mainly in constructing a knob and shank of two shells, an exterior and an interior, which are connected in such a manner that a base metal may be used to fill the space between them. These knobs may be easily applied to the door spindles in the same manner as porcelain and other knobs.

Figure 1:
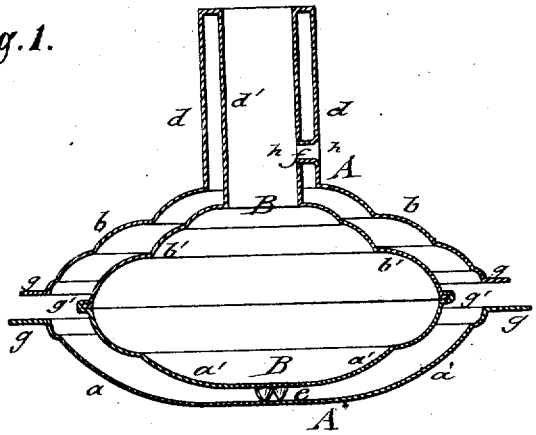
Figure 2:
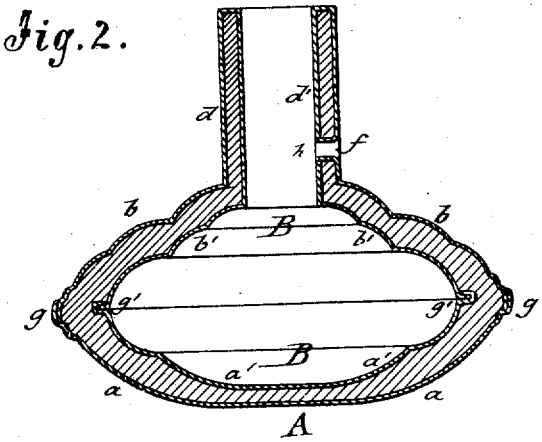

In the accompanying drawing, Figure 1 represents a vertical section of the shells forming our knob; and Fig. 2 a vertical section of the knob after the metal has been cast between the shells.

Similar letters of reference indicate corresponding parts.

A represents the outer shell, which is composed of three parts, the face part *a*, upper part *b*, and shank-tube *d*, stamped or swaged of suitable sheet metal according to the finish, which is desired to be given to the knobs. The face part *a* may be appropriately molded and supplied with ornamental designs, more or less executed from the plainest to the most artistic. It is supplied with a rim or flange, *g*, corresponding with a similar one of part *b*, which flanges are folded over each other when the knob is finished. The shank-tube *d* is soldered or otherwise connected with part *b*, so as to form one piece with the same. The interior shell B is of smaller size than the outer shell, and corresponds in form to it, so that a uniform thickness of metal may be obtained. It consists, in similar manner, of three parts, the lower part *a'*, upper part *b'*, and the square tube *d'*, which is of the exact size of the door-spindles in general use. The parts *a'* and *b'* are also provided with flanges *g'*, which are clasped together, forming, in connection with the tube *d'*, one piece. The lower part *a'* has punched from the inside several guide projections or teats *e*, which rest on the outer shell and allow thereby the regulation of the thickness of the cast metal between the shells. Apertures *h* of tubes *d* and *d'* allow the insertion of an eyelet, *f*, of hard metal for the fastening screw of the knob. Shells A and B are placed in molds of proper shape in such a manner that face *a* rests on the bed portion of the mold, a suitable ring for the admission of the melted metal separating the face *a* and part *b*, their flanges *z* resting thereon. The inner shell B is placed on a door-spindle and inserted, with the upper part of shell A, into the upper mold, and secured therewith so that the required thickness of the shells in connection with the projections *e* is accurately retained. The eyelet is also placed in the shank-tubes and the space between the shells filled up by the metal. After cooling the knob is taken out, the flanges *g* are folded over, and the knob finished in the style required.

It is obvious that the combination of the outer and inner shells with the intermediate casting gives sufficient strength and produces at the same time a light and elegant knob.

Having thus described our invention, we claim as new and desire to secure by Letters Patent—

1. The metallic knob and shank, consisting of an exterior and interior shell, and the eyelet for the fastening-screw, the space between the shells being filled with metal, substantially as and for the purpose herein described.

2. The inner shell provided with projections or teats, substantially as and for the purpose described.

CHRISTIAN REBSTOCK.
JOSEPH OTTNER.

Witnesses:
HERMANN GAUSS,
EDWARD H. LYON.